United States Patent
Pham

(10) Patent No.: US 7,742,939 B1
(45) Date of Patent: Jun. 22, 2010

(54) VISIBILITY INDEX FOR QUALITY ASSURANCE IN SOFTWARE DEVELOPMENT

(75) Inventor: Ton Van Pham, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1342 days.

(21) Appl. No.: 11/072,185

(22) Filed: Mar. 4, 2005

(51) Int. Cl.
G06F 9/44 (2006.01)
(52) U.S. Cl. .......................................................... 705/7
(58) Field of Classification Search ........................ None
See application file for complete search history.

(56) References Cited

U.S. PATENT DOCUMENTS

| | | | |
|---|---|---|---|
| 5,548,506 A * | 8/1996 | Srinivasan ..................... | 705/8 |
| 6,324,647 B1 | 11/2001 | Bowman-Amuah | |
| 6,662,357 B1 | 12/2003 | Bowman-Amuah | |
| 6,895,382 B1 * | 5/2005 | Srinivasan et al. ............. | 705/7 |
| 7,051,036 B2 | 5/2006 | Rosnow et al. | |
| 7,117,161 B2 * | 10/2006 | Bruce ............................. | 705/8 |
| 7,139,999 B2 * | 11/2006 | Bowman-Amuah ......... | 717/101 |
| 7,430,498 B2 | 9/2008 | Butterfield et al. | |
| 7,559,049 B1 * | 7/2009 | Hemmat et al. ............. | 717/102 |
| 2001/0051913 A1 * | 12/2001 | Vashistha et al. .............. | 705/37 |
| 2002/0026630 A1 | 2/2002 | Schmidt et al. | |
| 2002/0042731 A1 * | 4/2002 | King et al. .................... | 705/10 |
| 2002/0059512 A1 * | 5/2002 | Desjardins ..................... | 713/1 |
| 2003/0033191 A1 | 2/2003 | Davies et al. | |
| 2004/0143811 A1 | 7/2004 | Kaelicke et al. | |
| 2004/0243968 A1 * | 12/2004 | Hecksel ....................... | 717/100 |
| 2004/0255265 A1 | 12/2004 | Brown et al. | |
| 2005/0114829 A1 * | 5/2005 | Robin et al. ................. | 717/101 |
| 2005/0144592 A1 * | 6/2005 | Below et al. ................. | 717/124 |
| 2005/0216882 A1 | 9/2005 | Sundararajan et al. | |
| 2005/0289503 A1 | 12/2005 | Clifford | |
| 2006/0112371 A1 | 5/2006 | Oikawa et al. | |
| 2006/0123389 A1 | 6/2006 | Kolawa et al. | |
| 2006/0129439 A1 * | 6/2006 | Arlt et al. ....................... | 705/7 |

OTHER PUBLICATIONS

Kwak, Young H; Ibbs, C William Project Management Journal v31n2 pp. 38-47 Jun. 2000.*
Sanchez, Angel Martinez; Perez, Manuela Perez Project Management Journal v35n1 pp. 11-23 Apr. 2004.*
Cooper, Robert G; Edgett, Scott J; Kleinschmidt, Elko J Research Technology Management v43n2 pp. 18-33 Mar./Apr. 2000.*
Simpson, Thomas E; Seay, C Robert Jr Transactions of AACE International pp. CS111-CS114 1996.*
Coffin, Mark A.; Taylor, Bernard W., III IIE Transactions , v28 , n2 , p. 167(10) Feb. 1996.*

(Continued)

*Primary Examiner*—Romain Jeanty
*Assistant Examiner*—Brett Feeney

(57) ABSTRACT

A system and method for defining a visibility index for a project. The system and method consist of a plurality of categories, each of which characterizes an aspect of the project, an assessment of the aspect, a score that quantifies the assessment, a weight that quantifies the relative importance of each category, a weighted score derived by multiplying the score by the weight, and a visibility index derived by adding the weighted scores for at least two categories. The plurality of categories might include the size, complexity, priority, duration of the project, and the flexibility of the project's schedule.

18 Claims, 4 Drawing Sheets

OTHER PUBLICATIONS

Davis, Bobby; Fox, Patrick; Keithly, Thomas; Barr, William; Bowdren, Steve; Weiner, Dan; O'Brien, Timothy; Davis, Tom; Schultz, Melani; Piche, James D. ; Burke, Don Disam Journal, 27, 1, 1 Fall, 2004.*

Penny L. Sanchez, et al., Quality Index for Quality Assurance in Software Development, Filing Date—Mar. 4, 2005, U.S. Appl. No. 11/073,255, Specification (37 pgs.), Drawings (5 sheets).

Merzad Hemmat, Defining and Sizing Feasible Approaches to Business Needs Within an Integrated Development Process, Filing Date—May 5, 2003, U.S. Appl. No. 10/429,615, Specification (33 pgs.), Drawings (3 sheets).

Merzad Hemmat, Methods for Discovering Functional and Sytem Requirements in an Integrated Development Process, Filing Date—Aug. 18, 2003, U.S. Appl. No. 10/643,334, Specification (29 pgs.), Drawings (4 sheets).

Office Action dated Jun. 10, 2009, 20 pages, U.S. Appl. No. 11/073,255, filed Mar. 4, 2005.

Final Office Action dated Dec. 23, 2009, 22 pages, U.S. Appl. No. 11/073,255, filed Mar. 4, 2005.

* cited by examiner

| Category | Assessment | Score | Weight | Weighted Score |
|---|---|---|---|---|
| Size | Type C Project | 5 | 20% | 1.00 |
| Complexity | 15 Impacted Applications | 4 | 15% | 0.60 |
| Priority | Top 10 | 5 | 40% | 2.00 |
| Schedule | Operational Requirement | 4 | 15% | 0.60 |
| Duration | 18 Months | 5 | 10% | 0.50 |
| PROJECT VISIBILITY INDEX (PVI) | | | | 4.70 |

VISIBILITY INDEX FOR QUALITY ASSURANCE IN SOFTWARE DEVELOPMENT

CROSS-REFERENCE TO RELATED APPLICATIONS

This application contains subject matter related to U.S. patent application Ser. No. 10/429,615, filed May 5, 2003 and entitled "Defining and Sizing Feasible Approaches to Business Needs Within an Integrated Development Process", and to U.S. patent application Ser. No. 10/643,334, filed Aug. 18, 2003 and entitled "Method For Discovering Functional and System Requirements In An Integrated Development Process", and to U.S. patent application Ser. No. 11/073,255 entitled "Quality Index for Quality Assurance in Software Development" filed on even date herewith, all of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to project management. More particularly, embodiments of the present invention provide for the calculation of a visibility index for software development projects.

BACKGROUND OF THE INVENTION

Many enterprises implement quality assurance programs or similar efforts to ensure that their products meet the highest possible standards. In the area of software development, in particular, numerous guidelines exist for assuring the quality of development projects. For example, the ISO 9001 standard and the Capability Maturity Model Integration (CMMI) model both provide guidelines for conducting high quality software development projects.

CMMI designates five levels of organization and maturity in an enterprise's software development processes, with each level having a different set of requirements that must be met for CMMI certification to be achieved. The five CMMI levels, in order of least organized and least mature to most organized and most mature are initial, repeatable, defined, managed, and optimizing. It is generally desirable for an enterprise to reach the highest CMMI level possible.

Existing standards and guidelines such as CMMI typically provide general goals that, if met, are likely to result in a high quality product. Details on achieving those goals are typically not offered and typically must be developed by the enterprises following the standards.

SUMMARY OF THE INVENTION

An embodiment of the invention is a system for defining a visibility index for a project. The system consists of a plurality of categories, each of which characterizes an aspect of the project. The system also comprises an assessment of the aspect, a score that quantifies the assessment, a weight that quantifies the relative importance of each category, a weighted score derived by multiplying the score by the weight, and a visibility index derived by adding the weighted scores for at least two categories. The plurality of categories might include the size of the project, the complexity of the project, the priority of the project, the flexibility of the project's schedule, and the duration of the project.

An alternative embodiment is a method for determining the level of attention a project should be given. The method consists of assigning a score to an aspect of the project in each of a plurality of categories and multiplying the score for each category by a relative weight for the category to derive a weighted score for each category. The method also includes adding the weighted scores for each category to derive a visibility index and correlating the visibility index with the level of attention the project will be given. The plurality of categories might include the size of the project, the complexity of the project, the priority of the project, the flexibility of the project's schedule, and the duration of the project.

Another alternative embodiment is a system to enhance project development. The system consists of a user interface and a computational component. The user interface can display a plurality of categories, each of which characterizes an aspect of the project. The user interface can also display an assessment of the aspect, a score that quantifies the assessment, a weight that quantifies the relative importance of each category, a weighted score, and a visibility index. The computational component can compute the weighted score by multiplying the score by the weight, and can compute the visibility index by adding the weighted scores for at least two categories.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
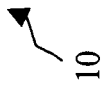
FIG. 1 is a diagram of a table that might be used to calculate a visibility index according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

An enterprise might simultaneously conduct multiple projects that differ in size, complexity, priority, and other factors. The human, financial, and technological resources needed to complete each project may also vary. To ensure that the proper resources are allocated to each project, a quantitative assessment can be made of the various aspects of the projects and a single number can be derived that indicates the level of attention each project should be given.

In an embodiment, several categories can be created to characterize various aspects of a project. Each category can be given a weighting to reflect the relative importance of the category. Within each category, a score can be given to a project to reflect a ranking of the project in the category. The score can be multiplied by the ranking to produce a weighted score. The weighted scores for each category can be added to produce a single number that reflects the level of attention the project will be given. This number can be referred to as the Project Visibility Index (PVI).

In an embodiment, the categories include size, complexity, priority, schedule flexibility, and duration. In other embodiments, other categories could be used. Project size can be based on the number of hours the project is projected to require for completion. Alternatively, for a software development project, project size can be based on the number of function points in the project. Complexity can be based on how many other projects are affected by the project in question. For a software development project, complexity might be based on the number of other applications that are affected. Priority can be based on where a project falls in a ranking of the priorities of all projects within an enterprise. Schedule flexibility can be based on a classification of the motivating factors that are driving the completion of a project. Duration can reflect the amount of time a project is expected to require for completion.

Each category can be weighted to reflect its relative importance. In one embodiment, size is given a weighting of 20%, complexity is given a weighting of 15%, priority is given a weighting of 40%, schedule flexibility is given a weighting of 15%, and duration is given a weighting of 10%. In other embodiments, other weightings could be used.

Within each category, a score can be given to a project to reflect a ranking of the project in the category. In an embodiment, the scores are 1, 2, 3, 4, or 5, with 5 reflecting the highest rank and 1 reflecting the lowest rank. For example, in the complexity category for a software development project, a score of 1 might be given to a project that impacts less than three other applications, a score of 2 might be given to a project that impacts less 3 to 5 other applications, a score of 3 might be given to a project that impacts 6 to 10 other applications, a score of 4 might be given to a project that impacts 11 to 15 other applications, and a score of 5 might be given to a project that impacts more than 15 other applications. In other embodiments, other scores and other numbers of impacted applications could be used.

For the priority category, all active projects in an enterprise are given a rank to reflect their priority. That is, the most urgent project is ranked first, the next most urgent project is ranked second, etc. A score of 1 might be given to a project that ranks below 50th in the ranking of the projects, a score of 2 might be given to a project that ranks 31st to 50th, a score of 3 might be given to a project that ranks 21st to 30th, a score of 4 might be given to a project that ranks 11th to 20th, and a score of 5 might be given to a project that ranks in the top 10. Alternatively, the rankings could be converted to percentages, where projects in the bottom 20% of the priority rankings are given a score of 1, projects in the range of 21% to 40% in the priority rankings are given a score of 2, projects in the range of 41% to 60% in the priority rankings are given a score of 3, projects in the range of 61% to 80% in the priority rankings are given a score of 4, and projects in the range of 81% to 100% in the priority rankings are given a score of 5. In other embodiments, other scores and other rankings of priorities could be used.

In the schedule flexibility category, a score of 1 might be given to a project that is intended to differentiate a project or improve customer experience; a score of 2 might be given to a project that is intended to grow revenue or decrease costs; a score of 3 might be given to a project that deals with normal growth in service delivery capabilities; a score of 4 might be given to a project that deals with operational requirements such as the upgrade, repair, and replacement needs of a business; and a score of 5 might be given to a project that is mandated by legal or industry standards. In other embodiments, other scores and other classifications for schedule flexibility could be used.

In the duration category, a score of 1 might be given to a project that is expected to last less than 3 months, a score of 2 might be given to a project that is expected to last between 3 and 5 months, a score of 3 might be given to a project that is expected to last between 6 and 9 months, a score of 4 might be given to a project that is expected to last between 10 and 12 months, and a score of 5 might be given to a project that is expected to last more than 12 months. In other embodiments, other scores and other durations could be used.

FIG. 1 illustrates an example of one embodiment of the above categories, weightings, and scores being used to derive a PVI for a software development project. A table 10 contains columns for category 11, assessment 13, score 15, weight 17, and weighted score 19. The rows of the table 10 contain the categories size 21, complexity 23, priority 25, schedule 27, and duration 29.

An assessment 13 has determined that the project is a type C project, meaning that the number of hours expected to complete the project is at the highest ranking for size 21. Thus, a score 15 of 5 is given for the size 21 category. The assessment 13 has also determined that 15 other applications will be impacted by the project. Using the complexity rankings given above, a score 15 of 4 is given for the complexity 23 category. The assessment 13 has also determined that the project is in the top 10 in a priority ranking of all projects in the enterprise. Using the priority rankings given above, a score 15 of 5 is given for the priority 25 category. The assessment 13 has also determined that the project is an operational requirement for the enterprise. Using the schedule flexibility rankings given above, a score 15 of 4 is given for the schedule 27 category. The assessment 13 has also determined that the project will last approximately 18 months. Using the duration rankings given above, a score 15 of 5 is given for the duration 29 category.

Each of these scores 15 is then multiplied by a weight 17. Using the weights given above, the score 15 of 5 for the size 21 category is multiplied by 20%, the score 15 of 4 for the complexity 23 category is multiplied by 15%, the score 15 of 5 for the priority 25 category is multiplied by 40%, the score 15 of 4 for the schedule 27 category is multiplied by 15%, and the score 15 of 5 for the duration 29 category is multiplied by 10%.

The results of these multiplications are weighted scores 19. When the above scores 15 are multiplied by the above weights 17, the resulting weighted scores 19 are 1.00 for the size 21 category, 0.60 for the complexity 23 category, 2.00 for the priority 25 category, 0.60 for the schedule 27 category, and 0.50 for the duration 29 category. These weighted scores 19 are then added together to produce a Project Visibility Index (PVI) 30 of 4.70.

In an embodiment, a graphical user interface (GUI) might be provided that is similar in appearance to the table of FIG. 1. The GUI might contain selectable boxes or similar components corresponding to the cells of the table in FIG. 1. A user might manually enter assessments, scores, and/or weights into the boxes. Alternatively, the boxes might contain drop-down lists or similar components that allow a user to select assessments, scores, and/or weights from predefined lists. The GUI might contain a component that automatically calculates weighted scores and a PVI using the values entered or selected by the user. Alternatively, a text-based data entry system, such as an SQL query, might be used for entry of PVI-related information. An automated calculation system might again be present to calculate a PVI based on the data entered.

The PVI can be used for many purposes in the management of a project such as validation and verification, risk management, program management, test management, or release management. The PVI might also be used to determine whether a quality advisor is assigned to a project. When the PVI for a project is above a predefined threshold, a quality advisor might be assigned to the project to consult with a project team and ensure that the standards set for the project are being followed. The quality advisor can facilitate project quality definition and planning, provide project collaboration, and oversee quality assurance activities throughout the lifecycle of a project.

The quality advisor would typically be heavily involved in the planning stages of a project where deliverables for the project are being determined, personnel are being assigned, and a schedule is being set. This early involvement can allow the quality advisor to keep the project team on track to meet CMMI, ISO 9001, or other guidelines. In particular, the quality advisor might assist an organization in meeting the certification requirements for a desired CMMI level. In an embodiment, a quality advisor is assigned to a project when the PVI for the project is greater than 3.5, but in other embodiments other thresholds could be used.

Figure 2:
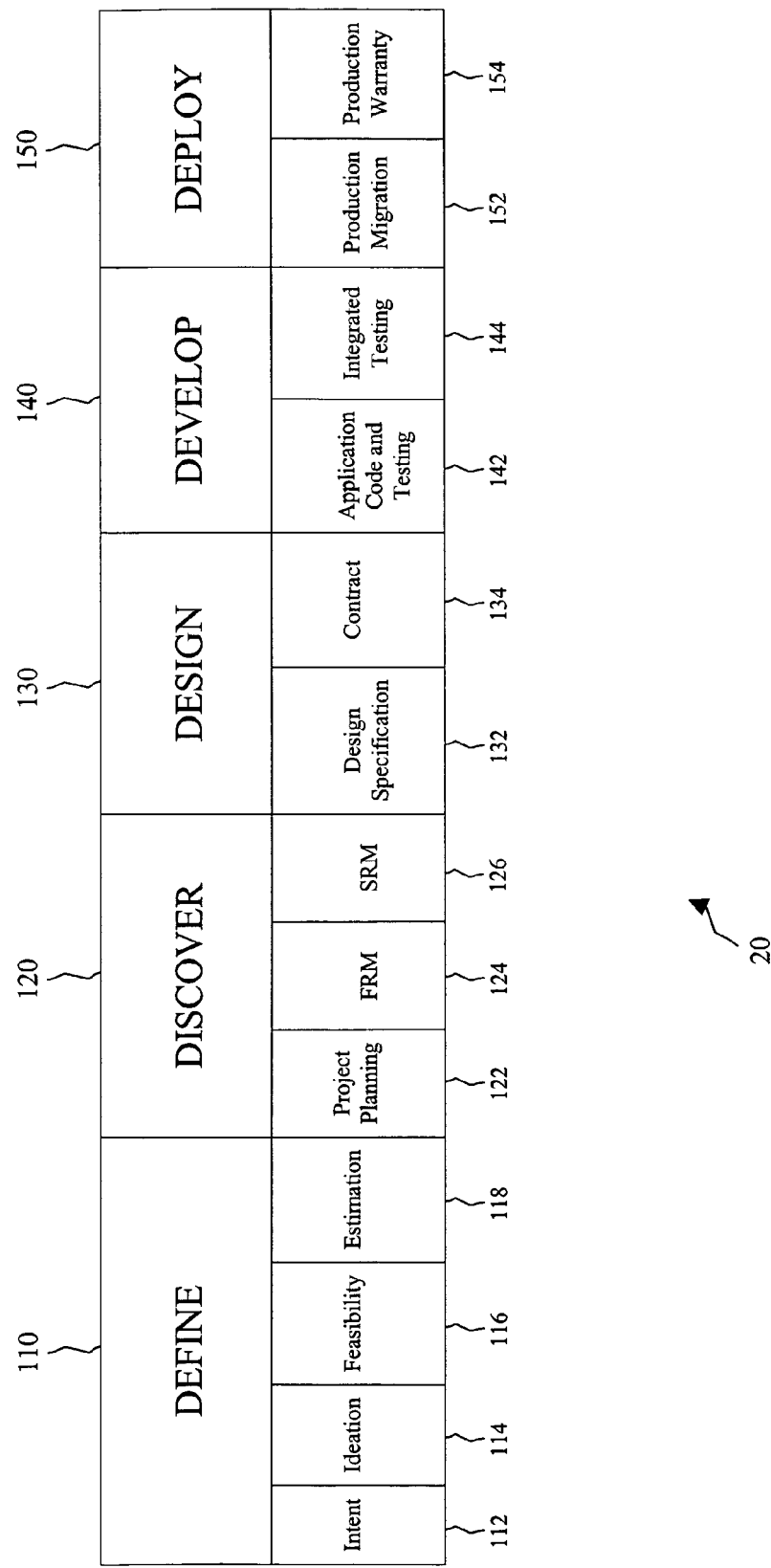
FIG. 2 is a block diagram of an Enterprise Development Process according to one embodiment of the present disclosure.

The PVI can be calculated for projects that follow an enterprise development process (EDP). An EDP with which the PVI can be used is described in U.S. patent application Ser. No. 10/429,615, filed May 5, 2003 and entitled "Defining and Sizing Feasible Approaches to Business Needs Within an Integrated Development Process", and in U.S. patent application Ser. No. 10/643,334, filed Aug. 18, 2003 and entitled "Method For Discovering Functional and System Requirements In An Integrated Development Process", both of which are incorporated herein by reference. The EDP process described therein comprises five phases: Define, Discover, Design, Develop, and Deploy. An optional sixth phase is a Demand phase that addresses feedback for long-term optimization. FIG. 2 illustrates an embodiment of the EDP 20.

The Define phase 110 of the EDP 20 encompasses processes that define the strategic intent of an enterprise and concepts that are aligned with the strategic intent. Robust concept definition and ensuing communications ensure a proposed approach is on target with what a business wants delivered. Alignment with strategic network and IT architectures is also facilitated. As a side benefit, the Define phase 110 can reduce estimation time averages.

The Define phase 110 typically comprises four steps, Intent 112, Ideation 114, Feasibility 116, and Estimation 118. Intent 112 refers to processes that help define the business's strategic intent through the integration of mission, goal, objective, and capability models. Business-related decisions are made at this point without consideration of feasibility or design.

The Ideation step 114 encompasses formal and informal idea generation and the rigor of idea selection via validation against strategic intent. In the Ideation step 114, a problem is defined in the context of Intent 112 and a technical approach to the problem is developed. Ideation 114 also ensures that the definitions of concepts are aligned with the strategic intent.

The Feasibility step 116 facilitates determination of technical approach, critical functional impacts, impacted systems, and overall feasibility of concepts prior to Estimation 118. Customer expectations can be managed by determining if the customer's expected delivery date is feasible. Within the Feasibility step 116, a concept is typically reviewed for completeness and then classified according to size, complexity, and proposed process paths. The Feasibility step 116 is typically performed before an estimation of costs is made and before a solution is designed.

The Estimation step 118 facilitates estimation of level of effort (LOE) to aid with prioritization and investment decisions. An appropriate capacity of personnel, hardware, and other resources can be reserved as needed to complete a project.

The Discover phase 120 refers to the processes that help discover functional and system requirements in support of business requirements. The Discover phase 120 facilitates a "process-driven" approach to requirements gathering. The analysis conducted in the Discover phase 120 verifies the business processes envisioned and elicits all the requirements of the project. These requirements can be documented in a centralized repository along with the business and system process models, thus enabling traceability and reuse on subsequent projects. As a by-product of the Discover phase 120 analysis, it is possible to automatically generate interfaces as well as test workflows and test cases. These automation capabilities shorten the test window and overall project cycle time.

The Discover phase 120 is comprised of three steps, Project Planning 122, Functional Requirements Modeling (FRM) 124, and System Requirements Modeling (SRM) 126. Project Planning 122 encompasses all aspects of the planning for a project. FRM 124 facilitates identification of functional requirements, linked to supporting business requirements. Each functional requirement typically maps to a business requirement. Typically, no IT evaluation is done at this point. Automated solutions can be sought in the SRM step 126. SRM 126 facilitates identification of system requirements, linked to supporting functional requirements. Each system requirement typically maps to a functional requirement.

The Design phase 130 deals with the processes that constitute definition of physical design specifications and that will serve as the basis for development efforts. The Design phase 130 allows a consistent level of design detail across all development teams. This helps reduce the integration test window by enabling all development teams to develop to the correct interface specifications. Ultimately, this can result in shorter test windows and faster speed to market.

The Design phase 130 is comprised of two steps, Design Specification 132 and Contract 134. Design Specification 132 defines the inter-application physical design specification that becomes a common point of reference and binding for intra-application design. It encompasses physical information (data), environment, and security specifications. Design Specification 132 also defines the intra-application physical design specification encompassing physical information (database) design. Intra-application design specifications are determined, including the selection of user interfaces such as screen layouts, report layouts, and invoice mockups. Next, an application database design can be created, incorporating a database logical model, a database physical model, and data access mappings. The application design can then be validated against system requirements and capacities. Finally, a peer review can be conducted.

The Contract step 134 creates visibility and accountability to an integrated view of a project. A contract is an agreement between a contract sponsor and an appropriate IT entity and typically incorporates a scope of deliverables, a schedule, and a cost (LOE). After a contract has been assembled, an internal IT review can be conducted wherein an IT team can review and sign off on the contract. The contract is then offered to the sponsor and the sponsor reviews the project for approval.

The Develop phase 140 concerns the processes that create and test application systems and program code software according to the specifications detailed in the Design phase 130. The Develop phase 140 typically consists of two steps, Application Code and Testing 142 and Integrated Testing 144. Application Code and Testing 142 refers to processes for creating and testing application system source code according to design specifications and IT standards. Applicable levels of testing are encompassed within the confinement of the application system (e.g., unit, string, system).

Integrated Testing 144 refers to planning and execution of testing activities to ensure successful integration of application systems. Processes are performed that test the end-to-end business functionality across application systems. In the Integrated Testing step 144, a consolidated integration test plan can be created, including plans for inter-application connectivity testing, end-to-end testing, production-readiness testing, the test environment, test data, and automation tools.

The Deploy phase 150 involves processes for planning and implementing the activities required to migrate program code from the development environment to the production environment. The Deploy phase 150 typically encompasses two steps, Production Migration 152 and Production Warranty 154. Production Migration 152 defines the planning, execution, and verification activities required for migration from the development environment to the production (operational) environment.

Production Warranty 154 refers to the activities required during the transition period between deployment and on-going maintenance (also known as the warranty period) to ensure successful deployment. If a problem is identified in the warranty period, it is analyzed, isolated, and repaired. The repair is then verified and user acceptance is gained. The project can then be turned over to a production support group for ongoing maintenance and the project can be closed out.

When a PVI is used in conjunction with an EDP such as that described above, the calculation of the PVI would typically occur at some point during the transition from the Define phase to the Discover phase. Numerous projects might enter the Define phase of the EDP but only a limited number would typically be deemed worthy to proceed into the Discover phase. Calculating a PVI for a project that will not be continued past the Define phase could be a wasted effort. Also, since the size, complexity, priority, and other aspects of a project might not be known during the Define phase, a PVI calculation might not be possible at that point. When a project has been approved to enter the Discover phase, sufficient information is typically known about the project to allow a PVI to be calculated. Calculation of the PVI as a project is entering the Discover phase allows a quality advisor to be assigned to the project at an early enough point for the quality advisor to consult with a project team during the planning stages. This can assist the quality advisor in ensuring that the guidelines for compliance with CMMI, ISO 9001, or other standards are being met.

The calculation of the PVI might be done manually or through the entry of values into a computer-based spreadsheet or a similar automated calculation application. Alternatively, a graphical user interface might be associated with an EDP such as that described above. PVI-related values might be entered into the graphical user interface and a PVI for a project could be automatically calculated and associated with other data related to the project in a database of EDP data.

Figure 3:
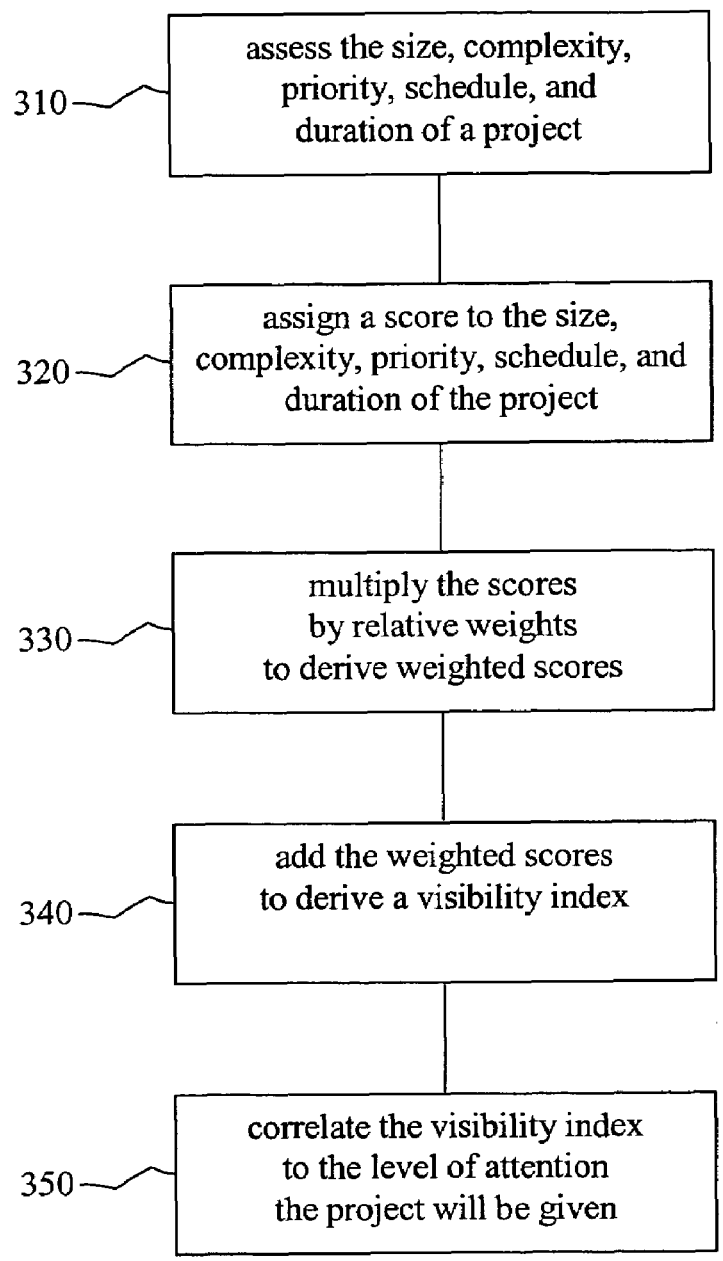
FIG. 3 is a flowchart of a method that might be used to calculate a visibility index according to one embodiment of the present disclosure.

A method for determining the level of attention a project should be given is illustrated in FIG. 3. In box 310, the size, complexity, priority, schedule flexibility, and duration of a project are assessed. In box 320, scores are assigned to the size, complexity, priority, schedule flexibility, and duration of the project. In box 330, each score is multiplied by a weight that reflects the relative importance of each of the categories of size, complexity, priority, schedule flexibility, and duration. The result of the multiplication is a weighted score for each of the categories. In box 340, the weighted scores are added together to derive a visibility index. In box 350, the visibility index is correlated with the level of attention the project will be given. Typically, a greater level of attention will be given to a project with a greater visibility index.

Figure 4:
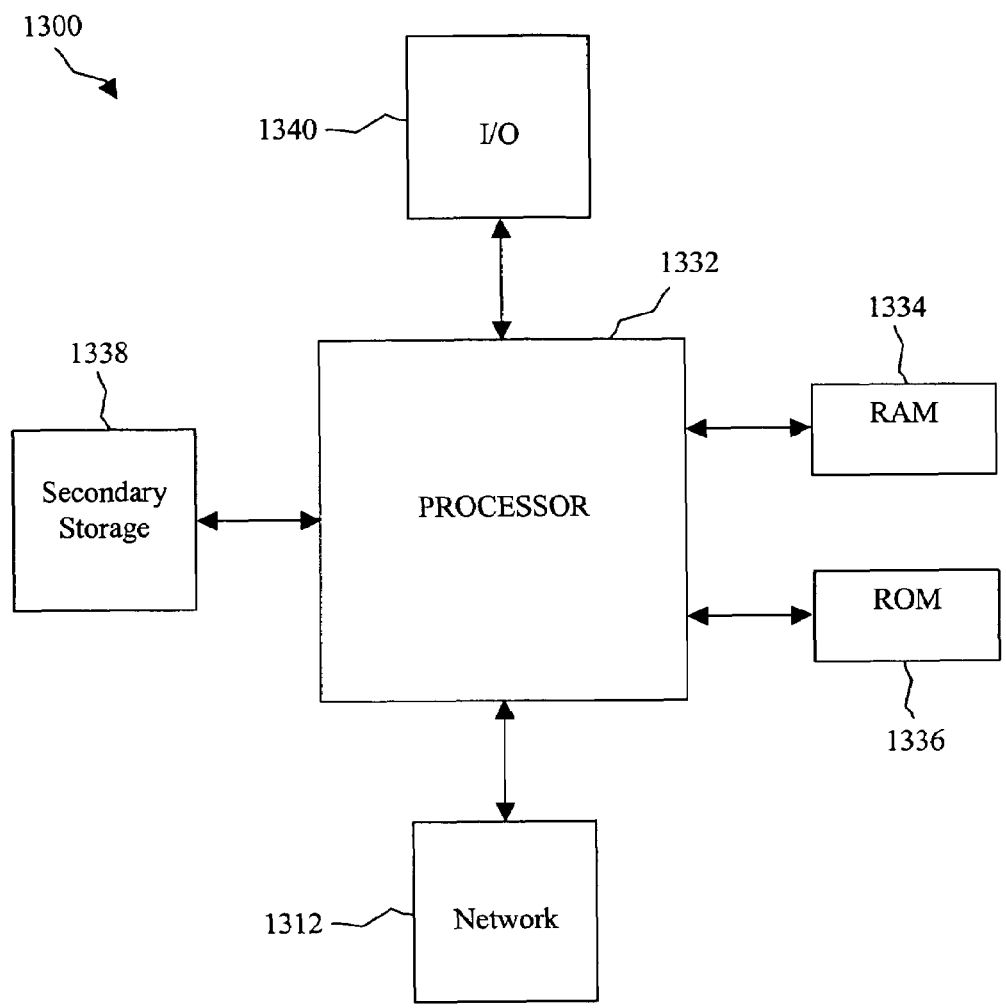
FIG. 4 is a block diagram of a computer system operable for some of the various embodiments of the present disclosure.

A visibility index as described above may generally be implemented on a variety of different computer systems. FIG. 4 illustrates a typical, general-purpose computer system suitable for implementing the present invention. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that the Visibility Index for Quality Assurance in Software Development may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A system for defining a visibility index for a project comprising:
  a data store comprising:
    a plurality of categories, each of which characterizes an aspect of the project, wherein the plurality of categories comprises:
      a size of the project;
      a complexity of the project;
      a priority of the project;
      a schedule flexibility of the project; and
      a duration of the project;
    an assessment of the size of a first project;
    an assessment of the complexity of the first project;
    an assessment of the priority of the first project;
    an assessment of the schedule flexibility of the first project;
    an assessment of the duration of the first project;
    an assessment of the size of a second project;
    an assessment of the complexity of the second project;
    an assessment of the priority of the second project;
    an assessment of the schedule flexibility of the second project;
    an assessment of the duration of the second project;
    a score that quantifies the assessment of the size of the first project;
    a score that quantifies the assessment of the complexity of the first project;
    a score that quantifies the assessment of the priority of the first project;
    a score that quantifies the assessment of the schedule flexibility of the first project;
    a score that quantifies the assessment of the duration of the first project;
    a score that quantifies the assessment of the size of the second project;
    a score that quantifies the assessment of the complexity of the second project;
    a score that quantifies the assessment of the priority of the second project;
    a score that quantifies the assessment of the schedule flexibility of the second project;
    a score that quantifies the assessment of the duration of the second project;
    a first weight associated with the size of the project category;
    a second weight associated with the complexity of the project category;
    a third weight associated with the priority of the project category;
    a fourth weight associated with the schedule flexibility of the project category;
    a fifth weight associated with the duration of the project category, wherein each of the first weight, the second weight, the third weight, the fourth weight, and the fifth weight quantify a relative importance of the corresponding category;
  a visibility index calculator stored as a set of computer readable instructions in a data store that, when executed by a processor,
    derives a first visibility index associated with the first project based on summing a first product, a second product, a third product, a fourth product, and a fifth product, wherein the first product is formed by multiplying the first weight times the score that quantifies the assessment of the size of the first project, wherein the second product is formed by multiplying the second weight times the score that quantifies the assessment of the complexity of the first project, wherein the third product is formed by multiplying the third weight times the score that quantifies the assessment of the priority of the first project, wherein the fourth product is formed by multiplying the fourth weight times the score that quantifies the assessment of the schedule flexibility of the first project, wherein the fifth product is formed by multiplying the fifth weight times the score that quantifies the assessment of the duration of the first project,
    derives a second visibility index associated with the second project based on summing a sixth product, a seventh product, an eighth product, a ninth product, and a tenth product, wherein the sixth product is formed by multiplying the first weight times the score that quantifies the assessment of the size of the second project, wherein the seventh product is formed by multiplying the second weight times the score that quantifies the assessment of the complexity of the second project, wherein the eighth product is formed by multiplying the third weight times the score that quantifies the assessment of the priority of the second project, wherein the ninth product is formed by multiplying the fourth weight times the score that quantifies the assessment of the schedule flexibility of the second project, wherein the tenth product is formed by multiplying the fifth weight times the score that quantifies the assessment of the duration of the second project, and correlating, by the processor, the first visibility index and the second visibility index with a level of attention the first project and the second project will be given.

2. The system of claim 1, wherein, when the visibility index for a project exceeds a threshold, a quality advisor is assigned to the project to assist in complying with a quality assurance standard to ensure the project meets a desired level of quality.

3. The system of claim 1, wherein at least one of the first and the second project is a software development project.

4. The system of claim 1, wherein the first and the second project follow enterprise development process comprising:
a define phase in which a strategic intent of an enterprise and a concept that is aligned with the strategic intent are defined;
a discover phase in which an analysis of a functional requirement for the project and an analysis of a system requirement for the project are performed;
a design phase in which a physical design specification that will serve as a basis for a development effort is created;
a develop phase in which software is created and tested according to the specification created in the design phase; and
a deploy phase in which the software is migrated from a development environment to a production environment.

5. The system of claim 4, wherein the first and the second visibility indices are derived between the define phase and the discover phase.

6. The system of claim 5, wherein the scores are entered into one of a text-based data entry system and a graphical user interface associated with the enterprise development process, the visibility indices are automatically calculated by software associated with the enterprise development process, and the visibility indices are associated with other data related to the first and second projects.

7. The system of claim 6, wherein the visibility indices are operable to promote certification at one or more Capability Maturity Model Integration levels.

8. A method for determining a level of attention a project should be given comprising:
assigning, by a computational component stored as a set of computer readable instructions in a computer readable storage media and executed by a processor, a first score based on a size of the project, a second score based on a complexity of the project, a third score based on a priority of the project, a fourth score based on a schedule flexibility of the project, and a fifth score based on a duration of the project;
multiplying, by the computational component, the first score by a first weight to form a first product, wherein the first weight reflects a relative importance of project size;
multiplying, by the computational component, the second score by a second weight to form a second product, wherein the second weight reflects a relative importance of project complexity;
multiplying, by the computational component, the third score by a third weight to form a third product, wherein the third weight reflects a relative importance of project priority;

multiplying, by the computational component, the fourth score by a fourth weight to determine a fourth product, wherein the fourth weight reflects a relative importance of project schedule flexibility;
multiplying, by the computational component, the fifth score by a fifth weight, to determine a fifth product, wherein the fifth weight reflects a relative importance of project duration;
adding, by the computational component, the first product, the second product, the third product, the fourth product, and the fifth product to derive a visibility index; and
correlating, by the computational component, the visibility index with the level of attention the project will be given, wherein the visibility index is used to evaluate the project in respect to a plurality of different projects.

9. The method of claim 8, further comprising assigning a quality advisor to the project when the visibility index for a project exceeds a threshold to assist in complying with a quality assurance standard to ensure the project meets a desired level of quality.

10. The method of claim 8, wherein the project is a software development project.

11. The method of claim 8, wherein the project follows an enterprise development process comprising:
a define phase in which a strategic intent of an enterprise and a concept that is aligned with the strategic intent are defined;
a discover phase in which an analysis of a functional requirement for the project and an analysis of a system requirement for the project are performed;
a design phase in which a physical design specification that will serve as a basis for a development effort is created;
a develop phase in which software is created and tested according to the specification created in the design phase; and
a deploy phase in which the software is migrated from a development environment to a production environment.

12. The method of claim 11, wherein the visibility index is calculated between the define phase and the discover phase.

13. The method of claim 12, wherein the scores are entered into one of a text-based data entry system and a graphical user interface associated with the enterprise development process, the visibility index is automatically calculated by software associated with the enterprise development process, and the visibility index is associated with other data related to the project.

14. The method of claim 13, wherein the visibility index is operable to promote certification at one or more Capability Maturity Model Integration levels.

15. A system to enhance project development comprising:
one or more computers including one or more data stores comprising:
a plurality of categories of a project, each of which characterizes an aspect of the project, wherein the plurality of categories comprises a size of the project, a complexity of the project, a priority of the project, a schedule flexibility of the project and a duration of the project;
a plurality of assessments of the project, each of which assesses a corresponding one of the plurality of categories of the project, wherein the plurality of assessments comprise an assessment of the size of the project, an assessment of the complexity of the project, an assessment of the priority of the project, an assessment of the schedule flexibility of the project, and an assessment of the duration of the project;

a plurality of scores of the project that each quantify a corresponding one of the plurality of assessments, wherein the plurality of scores comprise a first score that quantifies the assessment of the size of the project, a second score that quantifies the assessment of the complexity of the project, a third score that quantifies the assessment of the priority of the project, a fourth score that quantifies the assessment of the schedule flexibility of the project, and a fifth score that quantifies the assessment of the duration of the project;

a plurality of weights that each quantify a relative importance of each of the plurality of categories, wherein the plurality of weights comprise a first weight that reflects a relative importance of project size, a second weight that reflects a relative importance of project complexity, a third weight that reflects a relative importance of project priority, a fourth weight that reflects a relative importance of project schedule flexibility, and a fifth weight that reflects a relative importance of project duration;

a plurality of weighted scores calculated based on the plurality of scores and the plurality of weights; and a visibility index;

the one or more computers further including a computational component stored as a set of computer readable instructions in a computer readable storage media and executed by a processor to compute a first of the plurality of weighted scores by multiplying the first score by the first weight, to compute a second of the plurality of weighted scores by multiplying the second score by the second weight, to compute a third of the plurality of weighted scores by multiplying the third score by the third weight, to compute a fourth of the plurality of weighted scores by multiplying the fourth score by the fourth weight, to compute a fifth of the plurality of weighted scores by multiplying the fifth score by the fifth weight, and further operable to compute the visibility index by adding at least two of the plurality of weighted scores; and the one or more computers further including a component stored as a set of computer readable instructions in a computer readable storage media and executed by a processor, to promote association of a quality advisor with the project to assist in complying with a quality assurance standard to ensure the project meets a desired level of quality when the visibility index exceeds a threshold.

16. The system of claim 15, wherein the project follows an enterprise development process comprising:

a define phase in which a strategic intent of an enterprise and a concept that is aligned with the strategic intent are defined;

a discover phase in which an analysis of a functional requirement for the project and an analysis of a system requirement for the project are performed;

a design phase in which a physical design specification that will serve as a basis for a development effort is created;

a develop phase in which software is created and tested according to the specification created in the design phase; and a deploy phase in which the software is migrated from a development environment to a production environment.

17. The system of claim 16, wherein the visibility index is calculated between the define phase and the discover phase.

18. The system of claim 15, wherein the visibility index is operable to promote certification at one or more Capability Maturity Model Integration levels.

* * * * *